United States Patent [19]

Melchior

[11] Patent Number: 4,485,624
[45] Date of Patent: Dec. 4, 1984

[54] SUPERCHARGED INTERNAL COMBUSTION ENGINE EQUIPPED WITH AN AIR INTERCOOLING SYSTEM

[76] Inventor: Jean F. Melchior, 126 Bld de Montparnasse, 75 015 Paris, France

[21] Appl. No.: 300,953

[22] Filed: Sep. 10, 1981

[30] Foreign Application Priority Data

Sep. 19, 1980 [FR] France ................. 80 20174

[51] Int. Cl.³ .............................................. F02B 37/04
[52] U.S. Cl. ........................................ 60/599; 165/34; 165/39; 236/35; 236/35.3
[58] Field of Search .................... 60/599; 123/563; 165/39, 100, 34; 236/35, 35.3

[56] References Cited

U.S. PATENT DOCUMENTS

| | | | |
|---|---|---|---|
| 3,203,499 | 8/1965 | Bentz et al. | 60/599 |
| 3,377,023 | 4/1968 | Costa et al. | 236/35 |
| 3,712,282 | 1/1973 | Isley | 123/563 |
| 3,976,041 | 8/1976 | Mettig et al. | 123/563 |
| 4,062,188 | 12/1977 | Cutler et al. | 60/599 |
| 4,077,219 | 3/1978 | Melchior et al. | 60/599 |
| 4,124,979 | 11/1978 | Tholen et al. | 60/599 |
| 4,176,630 | 12/1979 | Elmer | 236/35 |
| 4,258,550 | 3/1981 | Hinkle et al. | 60/599 |

FOREIGN PATENT DOCUMENTS

| | | | |
|---|---|---|---|
| 1022105 | 1/1958 | Fed. Rep. of Germany | 165/39 |
| 50215 | 5/1981 | Japan | 60/599 |
| 1017156 | 1/1966 | United Kingdom | 60/599 |
| 1205941 | 9/1970 | United Kingdom | 165/39 |

OTHER PUBLICATIONS

"A Primer on Low-Temperature Aftercooling", *Automotive Engineering*, pp. 59–64, Feb. 1983, vol. 91, No. 2.
"Engine Charge Air Nomenclature–SAE J1148", 1982 *SAE Handbook*, Part 2, pp. 24.130–24.132.

*Primary Examiner*—Michael Koczo
*Attorney, Agent, or Firm*—Barnes, Kisselle, Raisch, Choate, Whittemore & Hulbert

[57] ABSTRACT

A highly supercharged engine with a high mean effective pressure (m.e.p.) is equippped with a cooling system including a radiator for the liquid cooling of the engine and a radiator for the supercharging air delivered by a turbocompressor. The liquid radiator is positioned upstream of the air radiator in the air-flow generated by a common blower.

16 Claims, 10 Drawing Figures

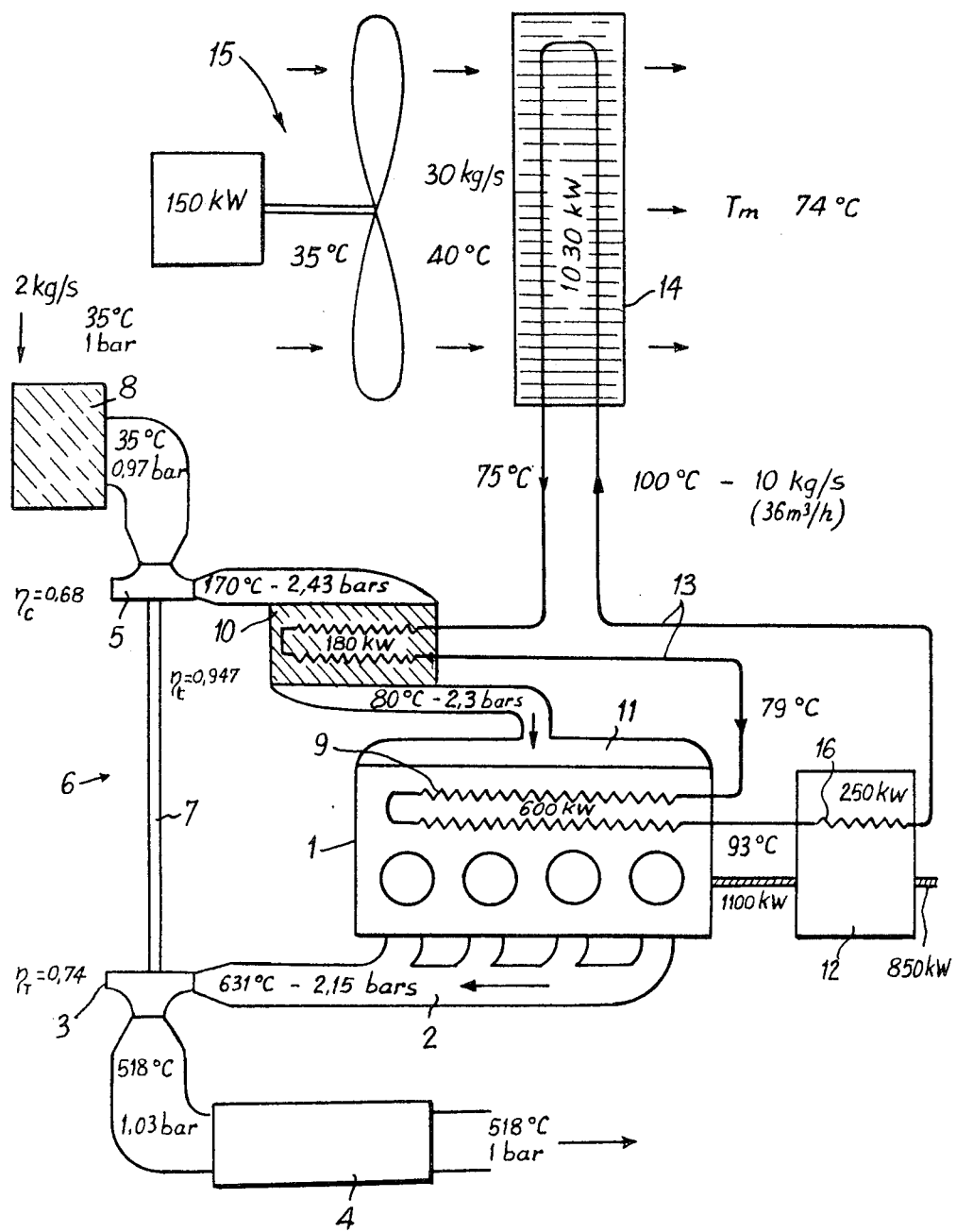
Fig.1 -PRIOR ART-SYSTEM A-

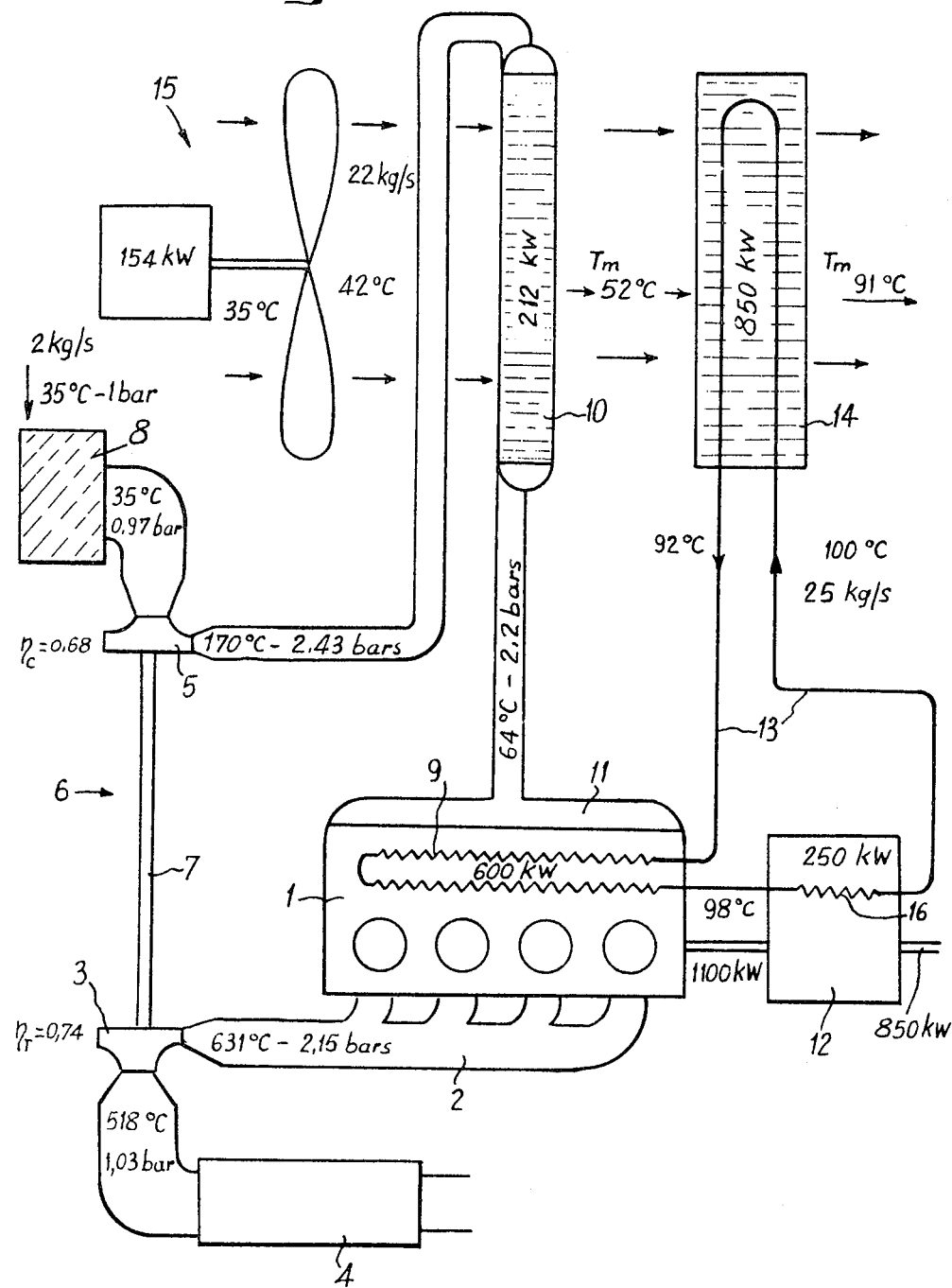
Fig. 2 —PRIOR ART—SYSTEM B—

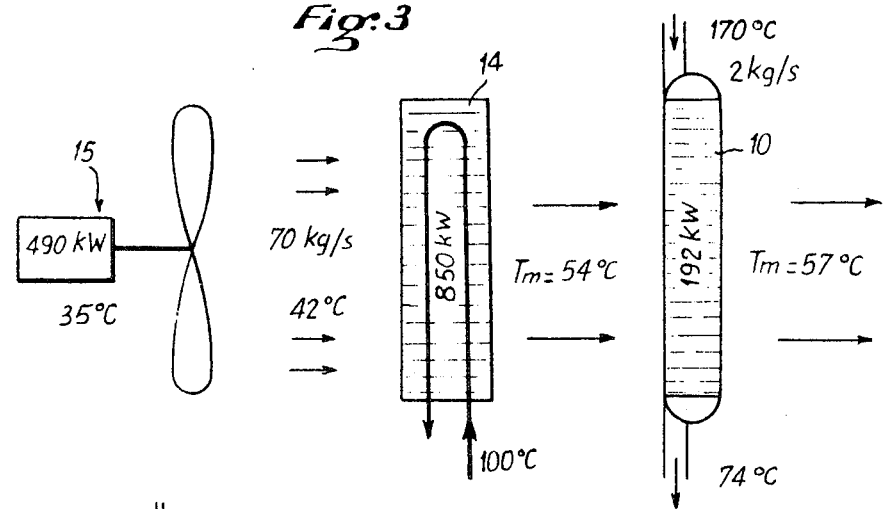
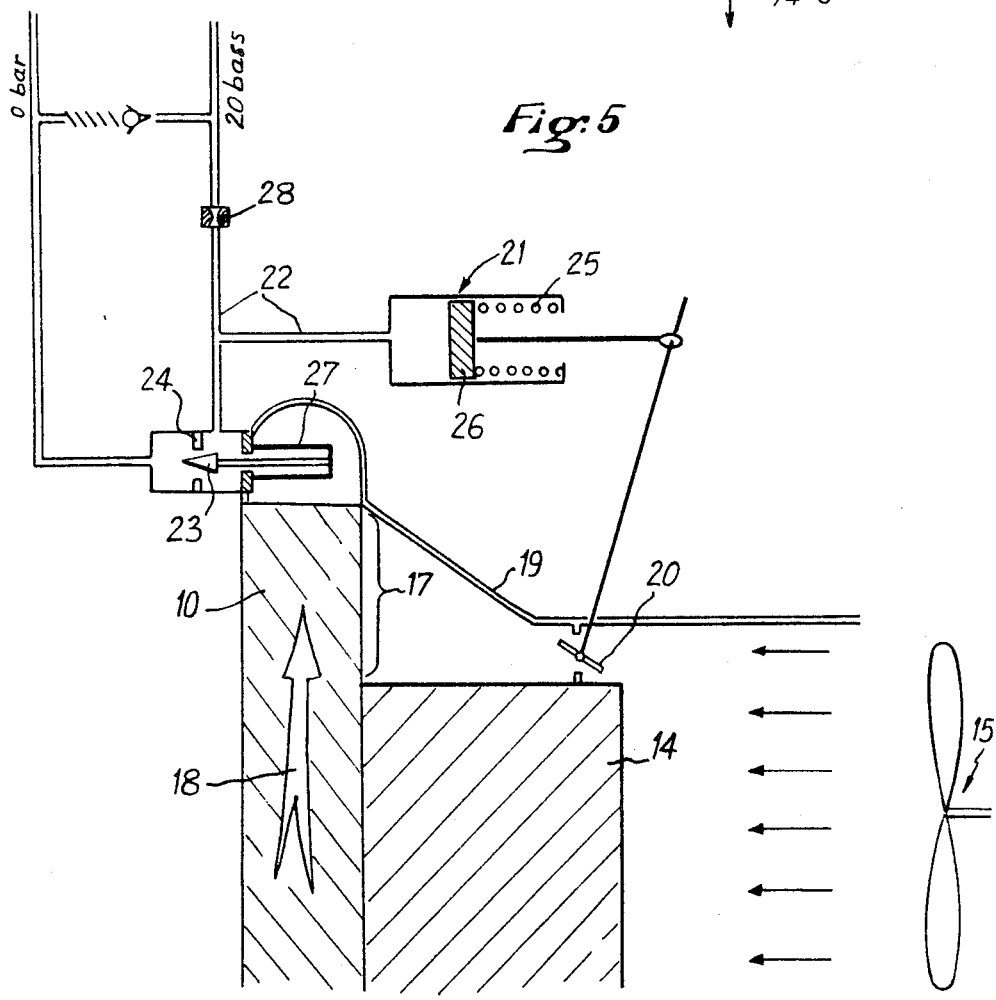

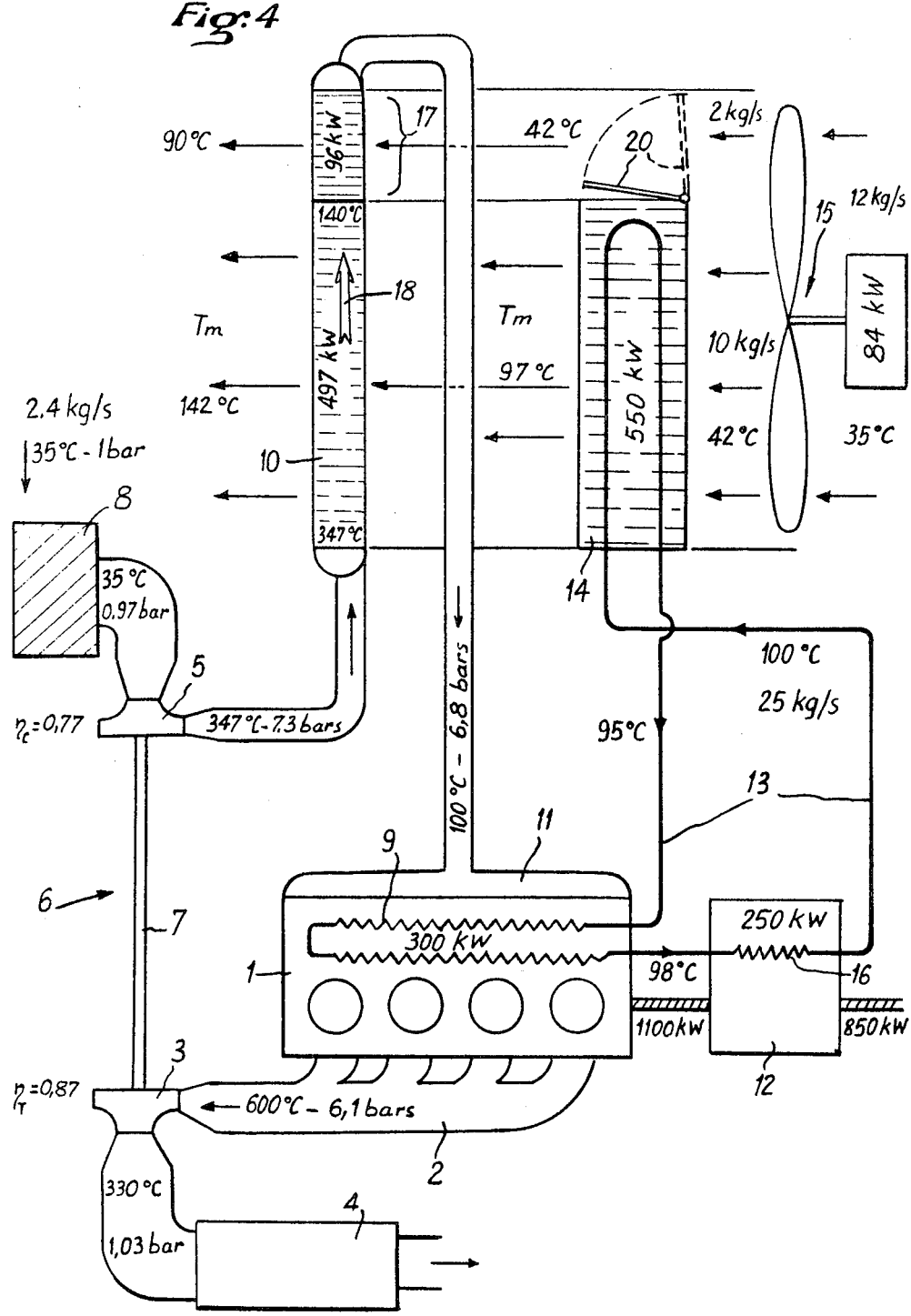

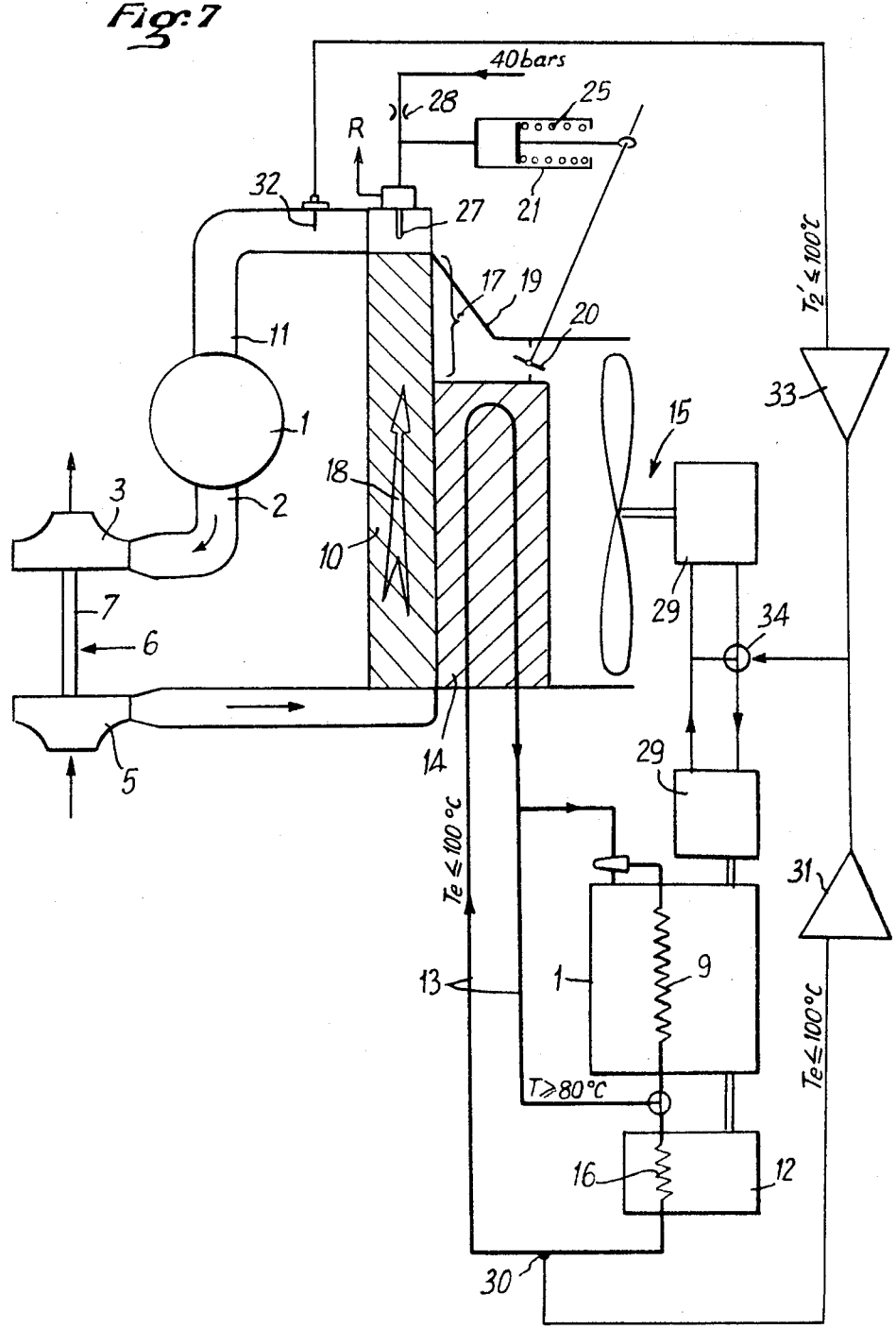

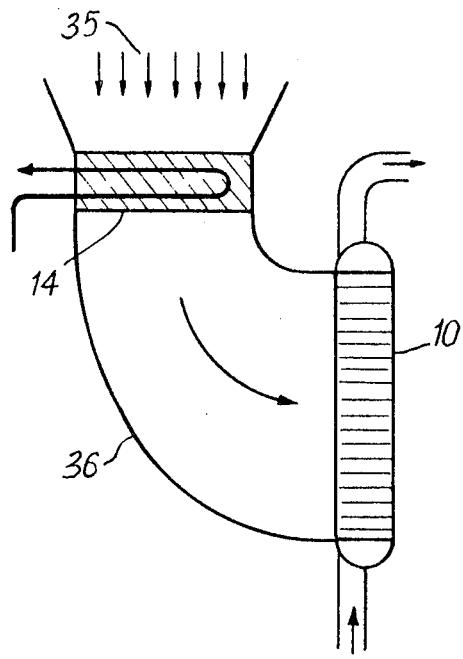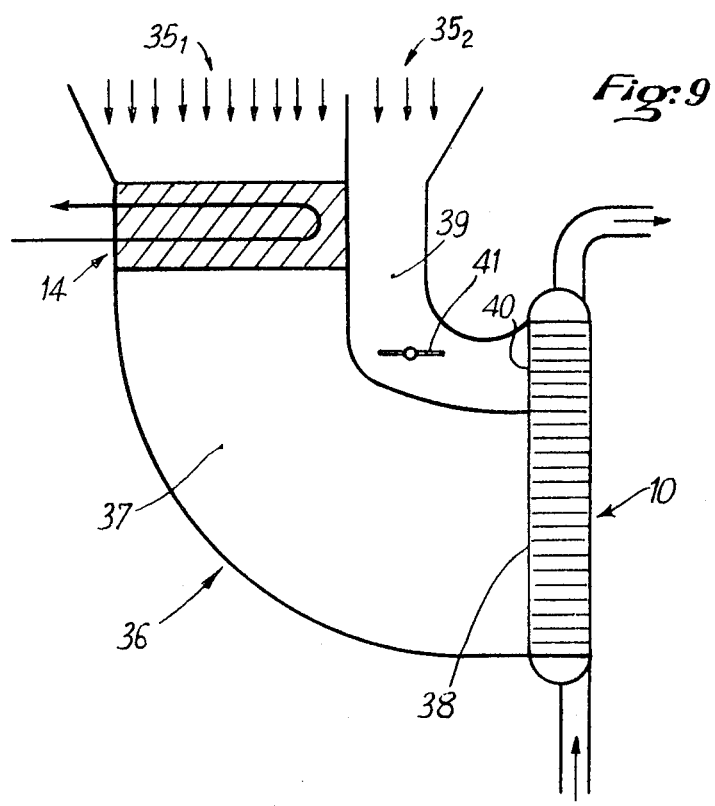

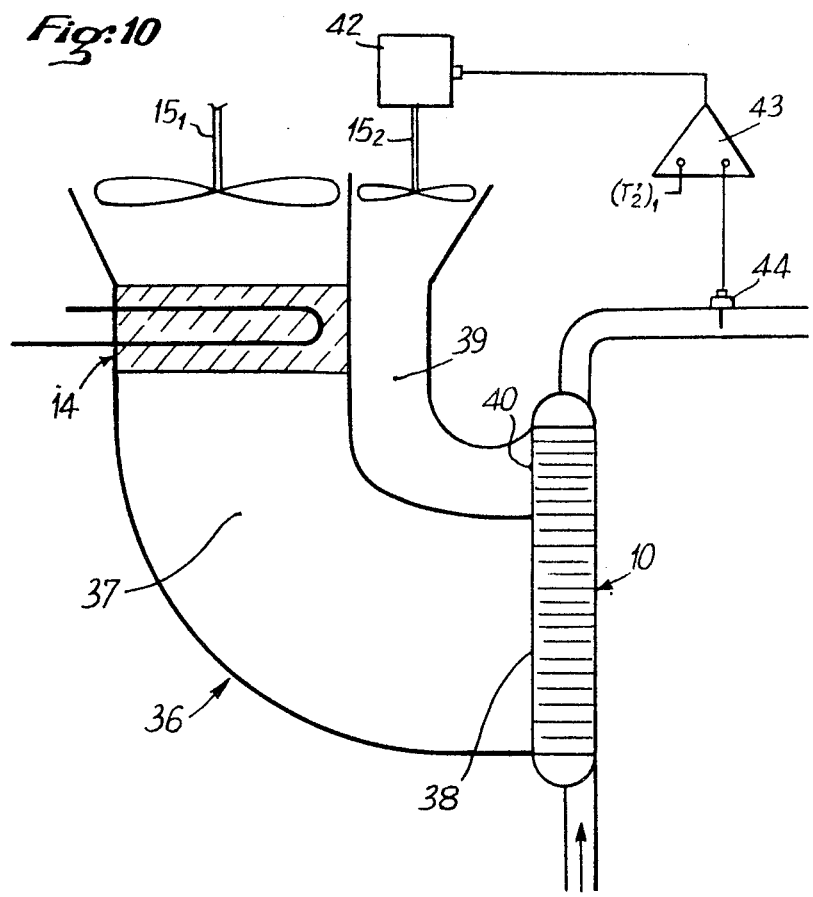
Fig:10
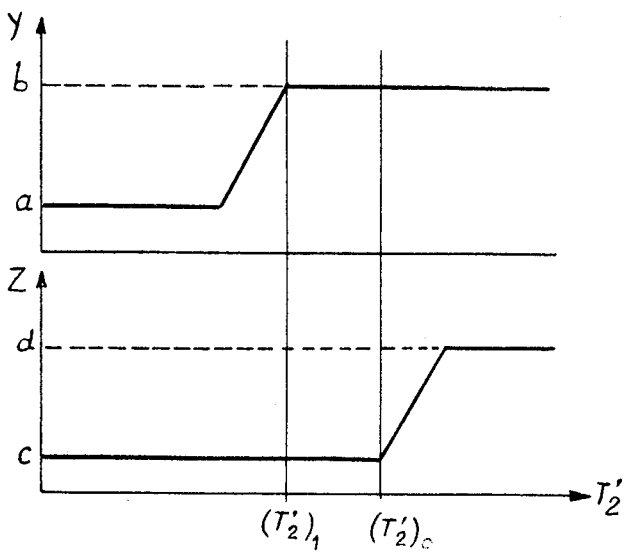
Fig:6

SUPERCHARGED INTERNAL COMBUSTION ENGINE EQUIPPED WITH AN AIR INTERCOOLING SYSTEM

The invention relates to internal combustion engines, particularly Diesel engines, which are supercharged by at least one turbocompressor and which are equipped with a forced ventilation cooling system including at least one liquid radiator, at least one air radiator and at least one device arranged to generate an air-flow through the two radiators and including pressure generating means arranged upstream (in the direction of the air-flow) of the radiators operating with at least one sheathing which channels air towards said radiators, the two radiators being arranged in series, with respect to the air-flow, and the liquid radiator forming part of a closed internal cooling circuit of the engine by liquid whilst the air radiator forms part of a direct cooling circuit of the supercharging air delivered by the turbocompressor. The invention also relates to cooling systems for such supercharged engines.

"Device arranged to generate an air-flow through the two radiators" means air-pressure generating means which cooperate with one or several sheathings or ductwork opening on all or part of the effective front surface (frontal heat exchange working surface area) of said radiators for conveying or channelling the generated air-flow thereto. The air pressure generating means may be constituted, for example, by one or several blowers delivering air, usually ambient air, into said sheathing. For a vehicle, these means may be the vehicle itself which captures the air in the sheathing according to its own speed.

By "liquid radiator", is meant here an air/liquid heat exchanger in which a heat-carrying liquid (generally constituted by a mixture of water and glycol), which is heated in cooling the jackets, the cylinder head and other elements of the engine such as, for example, the oil exchanger of the engine as well as possibly the oil of a transmission coupled to the engine (gear-box, torque converter, etc.), is cooled by heat exchange with the air delivered through this air/liquid heat exchanger. By "air radiator", is meant here an air/air heat exchanger, in which the supercharging air, when it is heated due to the fact of the compression to which it has been subjected in the turbocompressor, is cooled, before being admitted into the engine, by heat exchange with the aforementioned generated air flow delivered through this air/air exchanger.

It is an object of the invention to reduce the bulk and accessorily the weight of the air cooling system of a propulsion plant, for example the motor-propulsion unit of a vehicle.

It is also an object of the invention to provide means for minimising the power absorbed by the cooling system.

According to the invention, these objects are achieved, with an engine highly supercharged and at high rated average pressure (m.e.p.), by cooling system means wherein the liquid radiator is arranged, not downstream as is known, but upstream of the air radiator, in the abovesaid air-flow.

The invention will be explained in more detail by means of the accompanying drawings which permit comparison of the invention with the state of the art, describing preferred embodiments of the invention as well as the essential advantages of the latter.

BRIEF DESCRIPTION OF THE DRAWINGS

In the drawings:

FIGS. 1 and 2 show diagrammatically two supercharged Diesel engines which are respectively equipped with known prior art cooling systems, but different from one another.

FIG. 3 enables the inventive activity of the solution according to the invention to be explained with respect to that of known solutions which is illustrated in FIG. 2.

FIG. 4 shows diagrammatically, by a view similar to those of FIGS. 1 and 2, a supercharged Diesel engine according to a particular embodiment of the invention.

FIG. 5 shows an improvement in the embodiment of the engine shown in FIG. 4.

FIG. 6 shows an operating diagram.

FIG. 7 illustrates the regulation of the engine of FIG. 4, as modified according to FIG. 5.

FIGS. 8, 9 and 10 each show a modification of a part of FIG. 4.

STATE OF THE PRIOR ART

In order to understand better the invention as well as the inventive activity implicit therein and its essential advantages with respect to the state of the art, it appears useful to recall this state of the art by means of FIGS. 1 and 2.

The cooling systems of motor propulsion units, whose engine is cooled by a liquid, are often organised in two ways which be denoted by prior art system A (FIG. 1) and prior art system B (FIG. 2).

In all cases, there will be denoted below by 1 the internal combustion engine (Diesel engine), by 2 its exhaust manifold, by 3 a turbine into which the exhaust manifold 2 opens, by 4 a silencer or muffler traversed by the gases at their outlet from the turbine, by 5 a supercharging compressor constituting with turbine 3 a turbocompressor 6 and driven by the latter by means of a transmission shaft or the like 7, by 8 an air filter mounted in the input of the compressor 5, by 9 a cooling chamber of the engine 1, by 10 a heat exchanger serving to cool the supercharging air at the outlet from the compressor 5, by 11 the intake manifold of the engine 1, by 12 a transmission, notably a gearbox, coupled to the engine 1, by 13 a closed heat-carrying liquid cooling circuit, by 14 a heat exchanger (liquid radiator) incorporated in the circuit 13, by 15 a blower adapted to create an air-flow in the radiator 14 and driven by the engine 1, by 16 a heat exchanger which is generally incorporated in the circuit 13 and associated with the transmission 12 in order to cool the oil of this transmission.

According to the known system A which is illustrated in FIG. 1, the heat exchanger 10 is an air/liquid exchanger which is placed in the cooling circuit 13 downstream of the liquid radiator 14 and upstream of the cooling chamber 9 of the engine 1 so that the heat-carrying liquid of the circuit successively cools the supercharging air (exchanger 10), the engine 1 (cooling chamber 9), and the transmission oil 12 (exchanger 16), and is then cooled in the radiator 14 under the effect of the air-flow which is created therein by the blower 15.

The regulation of the temperature of the heat-carrying liquid is generally assured:

by the rotary speed of the blower 15, proportional to the engine speed 1;

and by various thermostatic regulating means.

Below is the heat balance sheet of a Diesel engine with moderate rated mean pressure (RMP) or mean effective pressure (m.e.p.) (less than 20 bars):

|  | kW | % |
|---|---|---|
| Shaft power | 1100 | 36 |
| Supercharging air | 180 | 6 |
| Heat-carrying liquid plus oil/engine | 600 | 20 |
| Exhaust | 1100 | 36 |
| Radiation | 60 | 2 |
| Fuel | 3040 | 100 |

With an engine equipped with the cooling system A (FIG. 1), the power to be extracted from the cooling liquid is distributed as follows (kW):

| Supercharging air | 180 |
|---|---|
| Liquid plus oil/engine | 600 |
| Transmission 12 | 250 |
|  | 1030 |

To extract this power, by way of example the following solution (I) was adopted:
Discharge rate of the pump of circuit 13: 36 m³/h (liquid)
Discharge rate of blower 15: 30 kg/s (air)
Pressure level of the blower 15: 0.04 bar
Power absorbed by the blower: 150 kW
Heating of the air through the blower: 5° C.

FIG. 1 indicates the majority of the above-indicated numerical values as well as the values of the temperatures and of the pressures at the principal points of the circuit. Thus at the level of the liquid radiator 14, the average temperature (Tm=74° C.) of the outflow of cooling air is indicated.

The advantages of solution A are as follows:
Single blower system
Natural heat regulation, at low powers, of the supercharging air, due to the regulation of the temperature of the cooling liquids;
possibility of placing the radiator 14 at a distance from the engine 1 without difficulty (liquid tube diameter moderate for circuit 13).

The drawbacks are the following:
blower air delivery rate very high, hence very bulky blower system and very high power absorbed by the blower;
difficulties in obtaining low air temperatures at the input of the engine 1;
interference dangers between the liquid circuit and the air circuit.

As regards the latter drawback, if the supercharging air pressure is higher than that of the cooling liquid of the engine, a leakage from the supercharging air radiator 10 has the result of introducing air into this liquid, whence a risk of depriming the pump of the circuit 13 and of destruction of the engine 1.

The known system B is distinguished from the system A by the fact that the heat exchanger 10 is not an air/-liquid exchanger but an air/air exchanger (air radiator) independent of the circuit 13. The regulation of the two radiators 10 and 14 may be single (the one or more blowers being actuated in parallel) or double (the air radiator 10 and the liquid radiator 14 each having their own blower whose regulation is independent of that of the other blower).

In weakly supercharged engines, the temperature of the air at the intake of engine 1 is relatively low. With ambient air at 40° C. and the supercharging ratio of 2.5, the air temperatures are as follows:

| Environment | $T_1 = 40°$ C. |
|---|---|
| Output from the compressor 5 (intake of the radiator 10) | $T_2 = 170°$ C. |
| Outlet of the radiator 10 (intake of the engine 1) | $T'_5 = 60°$ C. |

These performances require a radiator 10 whose thermometric yield $$7\text{th} = \frac{T_2 - T'_2}{T_2 - T_1} = \frac{110}{130} = 0.85$$

is high.

In the example selected of the engine of 1100 kW with moderate mean effective pressure, the power extracted from the air radiator 10 is about 200 kW. On the other hand, the power to be extracted from liquid 14 is much higher (about 850 kW in the example selected). These two radiators are hence highly unbalanced and, in the case of cooling by separate blowers, they would require very different devices. To avoid this drawback and taking into account the respective levels of the temperatures on the air side (60° C.) and on the liquid side (about 100° C.), it is possible to arrange the radiators 10 and 14 differently, as is known (see GB-A No. 1,017,156) and shown in FIG. 2, by placing them in series, so that the liquid radiator 14 is arranged downstream of the air radiator 10, in the air-flow generated by the common blower 15, which procures the following advantages:
better use of the frontal surface;
reduction of ventilation delivery rate;
a single ventilation system.

With an engine equipped with this cooling system B (FIG. 2), the power to be extracted from the cooling liquid is distributed as follows (in kW):

| Liquid plus oil/engine | 600 |
|---|---|
| Transmission 12 | 250 |
|  | 850 |

To extract this power, the following solution (II) by way of example is adopted:
Delivery rate of the pump of the circuit 13: 90 m³/h,
Delivery rate of the blower 15: 22 kg/s,
Pressure level of the blower 15: 0.06 bar,
Power absorbed by the blower: 154 kW,
Heating of the air through the blower: 7° C.

This solution (II) is distinguished from solution (I) described above by a higher delivery of the pump of the circuit 13 and by a smaller delivery from the blower 15. In the case of the solution (II), the pressure level is equal to the pressure drop in the water radiator 14 (0.04 bar as previously), increased by the pressure drop of the air radiator 10 (0.02 bar).

With the air cooler at 42° C. and an air radiator 10 having a thermometric yield of 0.83, an output temperature is obtained for the supercharging air, of:

$T'_2 = 170 - 0.83(170 - 42) = 64°$ C.

The advantages of the solutions illustrated in FIG. 2 are:
(1) a single blower system
(2) a reduction or elimination of the drawbacks of solution A by
    suppression of interference risks between the air and liquid circuits;
    possibility of reducing blower delivery rate;
    possibility of obtaining low temperatures of the air at the intake of the engine 1 (64° C. in the example cited);
    possibility of increasing the flow-rate of the pump of the circuit 13 and of operating with low temperature differences.

On the other hand the solution illustrated in FIG. 2 has the following drawbacks:
(1) It requires supercharged air under pressure to be conveyed in bulky ducts, up to the radiator 10 when the latter is located far from the engine;
(2) Contrary to solution A, it does not ensure natural heat regulation in cold weather at low powers; in fact, even when ventilation is stopped, by intense cold, the engine 1 sucks in very cold air which is prejudicial to its operations; this drawback occurs even transiently, when the cooling liquid of the engine 1 is hot, due to the fact of the upstream position of the air radiator 10.

To eliminate the latter drawback, it is impossible to reverse the air radiator 10 and the liquid radiator 14, that is to say to place the air radiator 10 downstream of liquid radiator 14 (in the air-flow generated by the blower 15) as has been assumed in FIG. 3. In fact, if in the example cited as reference in FIG. 2, it is desired that the temperature of the supercharging air should not exceed 64° C. at the outlet from the radiator 10, and if the latter has as previously a thermometric yield of 0.83, it would be necessary for the average temperature at the intake of said radiator 10 to be:

$$Tm = 170 - \frac{170 - 64}{0.83} = 42° C.$$

that is to say the same temperature as at the intake of the water radiator: for this an infinite ventilation flowrate would be necessary.

To obtain an outlet temperature of the supercharging air of 74° C. as in the example of FIG. 3 instead of 64° C. corresponding to the example of FIG. 2, a blower delivery rate of 70 kg/s (power absorbed 490 kW!) would be necessary, which is quite prohibitive. Having considered this, the engine according to the invention is of the very highly supercharged type and with high (generally over 20 bars and preferably of the order of 30 bars) rated mean pressure (RMP), more commonly referred to as mean effective pressure (m.e.p.). These engines, with a low volumetric ratio (VR on the order of 7), have a radically different heat balance sheet from that of engines with a moderte RMP (m.e.p.) and established approximately in the following manner:

|                              | kW   | %    |
|------------------------------|------|------|
| Shaft power                  | 1100 | 36   |
| Supercharging air            | 592  | 19.5 |
| Heat-carrying liquid plus oil/engine | 300 | 10 |
| Exhaust                      | 925  | 30.5 |
| Radiation                    | 123  | 4    |

-continued

|   | kW   | %    |
|---|------|------|
|   | 3040 | 100  |

The "heat-carrying liquid" item is reduced by half whereas the "supercharging air" item is trebled if the so called "conventional" solutions are compared therewith.

The thermal power of the radiators becomes:
air radiator/air 10: 592 kW
air radiator/liquid 14: 550 kW
    the latter value breaking down into:
        heat-carrying liquid plus oil/engine: 300 kW
        transmission 12: 250 kW.

Contrary to the case of the solution illustrated in FIG. 2, it is observed that the two air 10 and liquid 14 radiators are substantially balanced. In other respects, taking into account the lowering of the volumetric ratio of engines of the very highly supercharged type and with high RMP (m.e.p.), these engines accept higher air intake temperatures (of the order of 100° C.).

This permits, according to the invention, the placing of the liquid radiator 14, not downstream as is shown (FIG. 2), but upstream of the air radiator 10, in the air-flow generated by the blower 15, as shown diagramatically in FIG. 4 where the air-flow has been indicated (as moreover in the preceding figures) by a set of parallel horizontal arrows.

This novel arrangement of the radiators 10 and 14, which is unobvious from the state of the art, as emerges from the explanations given in respect of FIG. 3, has the following advantages:
(1) Very considerable reduction in the ventilation delivery rate, whence
    reduction in the bulk in the one or more blowers 15;
    reduction of the frontal heat exchange surface area of the radiators 10 and 14 (which results in a reduction of the apertures through which the ventilation air enters the engine compartment and emerges therefrom);
    reduction of the noise emitted by the blower system.
(2) At equal permeability of the radiators 10 and 14, considerable reduction of the power absorbed by the ventilation, as is seen from the following comparative table:

|                          | State of the art    |                     | Invention           |
|--------------------------|---------------------|---------------------|---------------------|
|                          | Example FIG. 1      | Example FIG. 2      | Example FIG. 4      |
| Pressure level (bar)     | 0.04                | 0.006               | 0.006               |
| Ventilation T (°C.)      | 5                   | 7                   | 7                   |
| Ventilation blowrate (kg/s) | 30               | 22                  | 12                  |
| Power absorbed (kW)      | 150                 | 154                 | 84                  |

(3) Natural regulation of the supercharging air temperature.
    In fact, when the weather is very cold and the engine is hot, the liquid radiator 14 constitutes a hot barrier protecting the air radiator 10: on transient returns to low power, there is hence no risk of stalling the engine 1 by the intake of cold air. For very highly supercharged engines (with low volumetric ratios), the problem of low power operation is critical: this advantage is hence determining. This possibility is further increased with the improvements which will be described below (mutual off-setting of the radiators 10 and 14 and regulation of the cooling air).

It should be noted that the two radiators 10 and 14 may just as well be flat as of any other shape. They may just as well be placed one behind the other, as in the example discussed with respect to FIGS. 4, 5 and 7, than separated as in the example of FIG. 8. In the latter case, the device arranged to generate an air-flow through said radiators 10 and 14 is constituted by pressure generating means, shown by the arrows 35 in FIG. 8, cooperating with a sheathing 36 enabling the ventilating air-flow to pass through the liquid radiator 14 and then air radiator 10.

According to an improvement which is illustrated in FIG. 9, and also in FIGS. 4, 5 and 7, said sheathing 36 is sub-divided into a first duct 37 which channels a portion of the total ventilating air-flow to the whole of the effective frontal surface (frontal heat exchange working surface area) of the liquid radiator 14, and then to a part only of 38 of the effective front surface of the air radiator 10, and into a second duct 39 which channels the other portion of the total air-flow directly to the remaining part 40 of the air radiator 10, without passing through the liquid radiator 14, this remaining part 40 being situated on the side from which the supercharging air emerges from the air radiator 10.

It is self-evident that the parts 38 and 40 of the radiator 10 may belong to one and the same radiator or be constructed as two distinct air radiators, placed in series. The pressure generating means causing the air-flow to circulate in the ducts 37 and 39, may be separate or common. If they are separate, as shown diagrammatically in FIG. 9, at $35_1$ and $35_2$, they could be regulated independently of one another. If they are common, the air-flow circulating in the two ducts 37 and 39 could be regulated by means of throttle means with variable passage cross-section 41, inserted at any point of the duct 39. These throttle means with variable passage cross-section could be common for example, a flap-valve or any other equivalent member, arranged in the duct 39 upstream of the part 40 of the air radiator 10, or also even a curtain more or less masking the inlet or the outlet of cooling air from said part 40.

According to a particular embodiment which is illustrated in FIGS. 4, 5 and 7, the air radiator 10 has effective frontal surface (heat exchange working surface area) greater than that of the liquid radiator 14, the nonoverlapping part 17 of the air radiator 10 being situated on th side of air radiator 10 through which the supercharging air emerges from this air radiator 10 (the direction of flow of the supercharging air in the radiator 10 being shown diagrammatically by an arrow 18). To this end, preferably, the two radiators 10 and 14 being flat and having substantially the same width (dimension perpendicular to the plane of the FIGS. 4, 5 and 7), the air radiator 10 has a length (vertical dimension in FIGS. 4, 5 and 7) greater than that of the liquid radiator 14.

According to a particularly advantageous embodiment, the non-overlapping part 17 of the air radiator 10 has a frontal surface heat exchange working surface area substantially equal to 20% of the frontal surface (working surface area) of the liquid radiator 14, that is to say, when the two radiators are of the same width, a length substantially equal to 20% of the length of the liquid radiator 14.

This mutual offset of the radiators 10 and 14 gives great flexibility to the temperature regulation. In fact, a thermometric yield of the order of 0.83 constitutes a value which is generally optimal from the point of view of the bulk of the air radiator 10 (an efficiency of 1 corresponding to infinite bulk). If the supercharging air enters at 347° C. into the radiator 10 and the ventilating air enters this radiator 10 at an average temperature of 97° C. (resulting from the heating in the liquid radiator 14 placed upstream thereof), the supercharging air emerges from the radiator 10 at a temperature equal to 347−0.83 (347−97)=140° C.

At maximum power, the temperature of the air at the intake of the engine 1 must be about 100° C. The completion of the cooling of the supercharging air, from 140° C. to 100° C., is assured by means of the non-overlapping part 17 which receives cooling air not at 97° C. but at 42° C. considering that this cooling air has not been heated by passage in the water radiator 14 but only under the effect of its compression by the blower 15.

According to an improvement illustrated in FIG. 5, throttle means, with variable passage cross-section, are mounted upstream (with respect to the air generated by the blower 15) of the non-overlapping part 17 of the air radiator 10. Preferably, these throttle means are controlled by means, sensitive to the temperature of the supercharging air at the outlet of the air radiator, which reduce the passage cross-section of these throttle means when this temperature drops below a pre-determined threshold $(T'_2)_1$.

If as is shown in FIG. 9, the pressure generating means, causing ventilating air to flow in the two ducts 37 and 39, are separate, they could be constructed, for example, by two blowers regulated independently of one another, as shown in FIG. 10.

A main blower $15_1$ driven by the engine 1, feeds the first duct 37. An auxiliary blower $15_2$, driven by an electric motor 42, feeds the second duct 39. A thermometric probe 44, arranged in the supercharging air at the outlet of the air radiator 10, is connected to a comparator 43 which cuts off the electrical supply of the motor 42 as soon as the supercharging air temperature drops below a given threshold $(T'_2)_1$.

As shown in FIG. 5, the non-overlapping part 17 is preceded by a sheathing or covering 19 designed to channel cooling air delivered by the blower 15 and short-circuiting the liquid radiator 14. At the intake of the covering 19 is placed a flap-valve 20, or equivalent throttle member, which is actuated by a hydraulic jack 21 whose natural position corresponds to the fully open position of the flap-valve 20, which assures safety in case of a fault of the hydraulic circuit supplying this jack 21 (leak, duct rupture, obturation, pump breakdown, etc.). This hydraulic circuit supplies the jack 21 with oil under pressure through a pipe 22 in which is placed a variable leakage orifice which is limited by a movable needle point 23 inside a fixed seat 24. Spring 25 acts on the movable piston 26 of the jack 21 against the effect of the pressurized oil admitted by the pipe 22, in the direction which tends to open the valve 20 widely. The needle valve 23 is actuated by a thermostatic element sensitive to the outlet temperature of the supercharging air and constituted, for example, by a hollow bar 27. On expanding, this bar 27, which bears the needle valve 23, dis-engages the latter from the seat 24 above said temperature threshold. This occurring, the pressure in the jack 21 falls due to the fact of the presence of the calibrated orifice 28 between this jack 21 in the pressurised oil supply to the latter. The pressure drop in the jack 21 results in the opening of the valve 20 and an increase in the flow-rate of ventilating air onto the non-overlapping part 17 of the air radiator 10. In fully open position, the passage cross-section of the flap 20 may be sufficiently small for the pressure drop created by the passage of the ventilating air flow-rate in this section to be substantially equal to the pressure drop through the liquid radiator 14. However, if the bulk permits, the valve 20, in fully open position, could be more permeable; in this case the non-overlapping part 17 could be smaller. A compromise exists from the point of view of bulk.

The invention enables the regulation of the ventilation to be easily assured in two ways.

In the first place, the blower 15 being driven by the engine 1, its speed is proportional to that of this engine, with a proportionality coefficient preferably adjustable, by means, for example, of a hydrostatic coupling of known type, shown diagrammatically at 29 in FIG. 7.

This proportionality coefficient may be modulated as a function:

(a) of the temperature $T_e$ of the liquid at the inlet of the radiator 14 so that this temperature is less than or equal to a threshold $(T_e)_o$ (maximum temperature of the cooling water);

(b) of the temperature $T'_2$ of the supercharging air at the outlet of the air radiator 10 so that this temperature is less than or equal to a threshold $(T'_2)_o$ (maximum temperature of the air entering the cylinders of the engine 1).

In FIG. 7, is shown diagrammatically the modulation of the proportionality coefficient by a probe 30 sensitive to the temperature $T_e$, whose outlet is connected to a first comparator 31, and by a probe 32 sensitive to the temperature $T'_2$, whose output is connected to a second comparator 33, these comparators 31 and 33 sending modulating signals into a control 34 associated with the hydrostatic coupling 29 in order to vary the ratio between the intake speed and the output speed of this coupling.

In the second place, the flap 20 which regulates the cooling air flow rate directly supplying the non-overlapping part 17 of the air radiator 10, is closed as soon as the temperature of the cooling air drops below a certain threshold $(T'_2)_1$.

In FIG. 6, is shown, as a function of the temperature $T'_2$ of the supercharging air at the outlet of the air radiator 10, the succession of the two types of regulation, on a double axis of ordinates, the axis Y corresponding to the degree of opening of the flap 20 and the axis Z to the speed of the blower 15. The ordinate a indicates the closing of the flap valve 20 and the ordinate b its full opening. The ordinate c indicates the minimum speed of the blower 15 and the ordinate d its maximum speed.

It is seen that the thresholds $(T'_2)_o$ and $(T'_2)_1$ are not necessarily equal. To avoid coupling between the two regulations on the supercharging air, it is even advantageous to regulate the regulating thresholds so that $(T'_2)_1$ is less than $(T'_2)_o$.

Of course, the cooling circuit of the engine 1 may be short-circuited in known manner when the temperature of the cooling liquid, at its intake into the engine, is less than or equal to a given threshold, for example 80° C., as has been indicated diagrammatically in FIG. 7.

In the description of the figures, consideration has only been given to a turbocompressor 6, an air radiator 10, a liquid radiator 14 and a blower 15. It is self-evident that the invention may just as easily be applied to the case where there would be two or several of each of these elements arranged in parallel.

What is claimed is:

1. A cooling system for an internal combustion engine of the type having a low volumetric compression ratio and highly supercharged by at least one turbocompressor so as to have a high mean effective pressure rating, said cooling system comprising a forced ventilation cooling system including at least one liquid radiator, at least one air radiator, and at least one device arranged to generate an air-flow through the two radiators and comprising pressure generating means cooperating with at least one sheathing which channels the air through said radiators, said two radiators and said pressure generating means being arranged in series, with respect to the air-flow, and wherein the liquid radiator is adapted to be part of a closed circuit for the internal liquid cooling of the engine whilst the air radiator is adapted to form part of a direct cooling circuit for the supercharging air delivered by the turbocompressor, said liquid radiator being arranged upstream of the air radiator in the abovesaid air-flow, said sheathing comprising a first duct which channels a first part of the total air-flow onto the whole of the liquid radiator, then onto a part of the air radiator, and a second duct which channels the complementary portion of the total air-flow directly onto the remaining part of the air radiator, situated close to the supercharging air outlet of said air radiator.

2. Internal combustion engine supercharged by at least one turbocompressor and equipped with a forced ventilation cooling system comprising at least one liquid radiator, at least one air radiator, and at least one device arranged to generate an air-flow through the two radiators and comprising pressure generating means cooperating with at least one sheathing which channels the air through said radiators, the two radiators and pressure generating means being arranged in series, with respect to the air-flow, and the liquid radiator forming part of a closed circuit for the internal liquid cooling of the engine whilst the air radiator forms part of a direct cooling circuit for the supercharging air delivered by the turbocompressor, wherein, the engine being highly supercharged and having a high rated mean effective pressure, the liquid radiator is arranged upstream of the air radiator, in the above-said air-flow, said sheathing comprising a first duct which channels a first part of the total air-flow onto the whole of the liquid radiator, then onto a part of the air radiator, and a second duct which channels the complementary portion of the total air-flow directly onto the remaining part of the air radiator, situated close to the supercharging air outlet of said air radiator.

3. The combination as set forth in claims 2 or 1 wherein said cooling system is constructed and operable such that the heat balance of said cooling system relative to said engine is operable to cause the temperature of the supercharged air delivered from said cooling system to the intake of said engine to be greater than that cooling liquid delivered from the cooling system to the inlet of the internal liquid cooling circuit of the engine.

4. The combination as set forth in claims 2 or 1 wherein said cooling system is constructed and operable such that the heat extracted from the supercharging air is substantially balanced with the heat extracted from the engine cooling liquid, the engine being highly supercharged and having a mean effective pressure in a range on the order of 20 to 30 bars.

5. Engine according to claim 2, wherein said pressure generating means are constituted by at least one blower delivering air into said sheathing.

6. Engine according to claim 2, wherein the two ducts each comprise pressure generating disposed therein which are independent of one another.

7. Engine according to claim 2, wherein the two ducts channel air-flows coming from the same pressure generating means and wherein the second duct comprises throttling means with variable passage cross-section.

8. Engine according to claim 7, wherein the throttling means are controlled by means, sensitive to the supercharging air temperature at the outlet of the air radiator, which reduce the passage cross-section of these throttling means as soon as said temperature drops below a certain threshold $(T-_2)_1$.

9. Engine according to claim 6, wherein the pressure generating means supplying the second duct are constituted by at least one blower controlled by means, sensitive to the supercharging air temperature at the outlet of the air radiator, which operate to stop the blower as soon as said temperature drops below a certain threshold $(T-_2)_1$.

10. Engine according to claim 2 or 5, wherein the air radiator has a frontal heat exchange surface area greater than that of the liquid radiator and is placed substantially against the air outlet of the liquid radiator, the non-overlapping part of the air radiator being situated on the side through which the supercharging air emerges from said air radiator.

11. Engine according to claim 10, wherein the air radiator and the liquid radiator being flat and having substantially the same width, and the air radiator has a greater length than that of the liquid radiator.

12. Engine according to claim 10, wherein the non-overlapping part of the air radiator has a frontal heat exchange surface area generally equal to 20% of the front surface of the liquid radiator.

13. Engine according to claim 10, wherein throttle means, of variable passage cross-section, are mounted upstream, with respect to the air-flow, of the non-overlapping part of the air radiator.

14. Engine according to claim 5 wherein the engine drives the blower through a coupling with an adjustable proportionality coefficient.

15. Engine according to claim 14, including means operable to adjust the speed ratio between said engine and said fan such that the proportionality coefficient is adjustable as a function of the temperature $T_e$ of the liquid, at the inlet of the liquid radiator, and as a function of the temperature $T'_2$ of the supercharging air, at the outlet of the air radiator, so as to prevent these temperatures from exceeding thresholds $(T_e)_o$ (maximum temperature of the cooling liquid) and $(T'_2)_o$ (maximum temperature of the air entering the cylinders of the engine) respectively.

16. Engine according to claim 15, wherein said last mentioned means is operable such that the thresholds $(T'_2)_o$ and $(T'_2)_1$ (minimum temperature of the ambient cooling air entering the liquid radiator) for effecting adjustments of the super-charging air are such that $(T'_2)_1$ is less than $(T'_2)_o$.

* * * * *